Oct. 13, 1970 P. J. GLASGOW 3,533,646
BOOKBINDING END LEAVES AND METHOD OF USE
Filed May 24, 1968 3 Sheets-Sheet 2

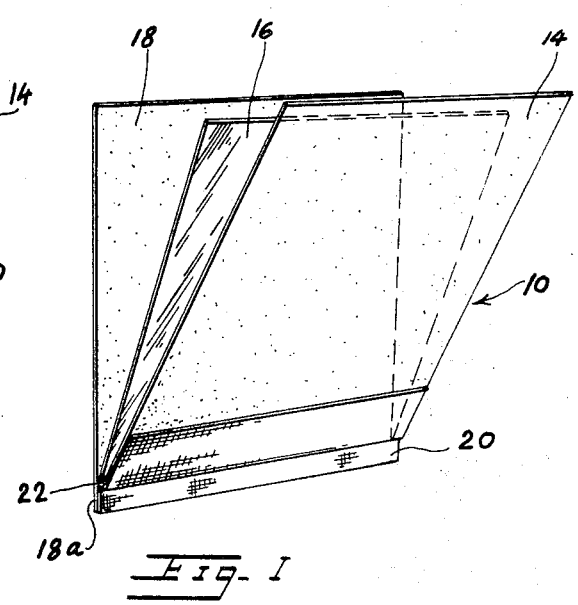

INVENTOR.
PAUL J. GLASGOW

BY *Stree + Stree*

ATTORNEYS

Oct. 13, 1970      P. J. GLASGOW      3,533,646
BOOKBINDING END LEAVES AND METHOD OF USE

Filed May 24, 1968      3 Sheets-Sheet 3

INVENTOR
PAUL J. GLASGOW
BY *Stoll & Stoll*
ATTORNEYS

United States Patent Office 3,533,646
Patented Oct. 13, 1970

1

3,533,646
BOOKBINDING END LEAVES AND
METHOD OF USE
Paul J. Glasgow, Woodmere, N.Y., assignor to Robbins
and Bendror Associates, Inc., Port Washington, N.Y.
Filed May 24, 1968, Ser. No. 740,407
Int. Cl. B42d 3/06
U.S. Cl. 281—21                                    14 Claims

ABSTRACT OF THE DISCLOSURE

Bookbinding end leaves having surfaces of different frictional coefficient for selective slidable relationship, and method of using same in the bookbinding process.

BACKGROUND OF THE INVENTION

Field of the invention

In the bookbinding industry, the use of end leaf assemblies in the binding and rebinding of books.

Description of the prior art

Traditionally, the attachment of end leaves to books is at least in part, a hand operation. The affixation of end leaves to books requires two securing operations, one to attach the end leaves to the books by gluing, sewing or other conventional means, the other to cover the attached portions. The second of these operations includes a folding step, whereby a portion of the outermost leaf is folded upon and secured to that portion of the innermost leaf which is attached to the book. Even in automated operations, the folding phase is manual, requiring the opening of the end leaves and their insertion into a mechanical folder.

Moreover, the mechanical folding operation has not been satisfactory for the reason, among others, that the fold is progressively formed longitudinally of its axis, resulting in an angular bias.

SUMMARY OF THE INVENTION

The invention is of an end leaf assembly and a method of attaching it to a book, including the step of folding one leaf upon another by means of a progressive looping and folding operation which proceeds transversely of the longitudinal axis of the fold, in perpendicular relation thereto, uniformly along its entire length.

To make such operation possible, the end leaf assembly of the present invention is provided with selected surfaces of different frictional coefficient to facilitate relative slidable movement between certain leaf surfaces and to impede such relative movement between other leaf surfaces.

More particularly, a typical end leaf assembly consists of three leaves (outer, inner and intermediate) hingedly secured together along one side edge thereof. The inner leaf of the assembly is the one which is attached to the book. The outer leaf is the one which is looped and then folded to cover that portion of the inner leaf that is attached to the book.

In the performance of this invention, the fold is formed in the outer leaf by sliding said leaf relative to the intermediate leaf in the direction of the hinge until a loop is formed, and then squeezing the loop flat upon itself to form the fold. These operations may be performed manually or mechanically, preferably, of course, the latter. My copending patent application, "Bookbinding Machine for Folding Book End Leaves," filed July 31, 1968, Ser. No. 749,113, now Pat. No. 3,478,378, issued Nov. 18, 1969, discloses and claims an automated machine for performing the looping and folding operations sequentially.

Essential in this operation is a method of assuring relative slidable movement between the outer and intermediate leaves, and preventing such movement between the intermediate and inner leaves or between the inner leaf and the adjacent page in the book. This objective is achieved by reducing the frictional coefficient between the outer and intermediate leaves or increasing the frictional coefficient between the intermediate and inner leaves, or both.

The invention is not, however, limited to a three-leaf end leaf assembly. A two-leaf assembly may also be used. However three-leaf assemblies are more commonly used and the invention will be described mainly in terms of three-leaf assemblies.

In the making of paper, one side (called the wire side) normally has a rougher texture than the opposite side (called the felt side). Various procedures are followed to equalize the texture on both sides of the paper. In the present case, the opposite objective is sought, namely, to emphasize and extend the texture differential between the two sides of the paper. The following methods and means of attaining the desired texture—and hence friction-differential—are illustrative of the many which may be employed for the purposes of this invention:

(1) Additives may be applied to one side of the paper to produce a smoother texture and decrease the frictional coefficient. Clay and wax are commonly used for this purpose. Other additives and coatings may be applied for the same purpose.

(2) A smoother surface and hence a lower frictional coefficient may be attained during the calendering operation. For example, the application of steam to one side of the paper in connection with the calendering operation will result in a smoother surface and a reduced frictional coefficient.

(3) Additives or coatings may be applied to one side of the paper to increase the frictional coefficient, and in that way to increase the frictional differential between the opposite sides of the paper. By way of illustration colloidal silica (manufactured and sold by Du Pont under the trademark Ludox) may be applied to one surface. This will increase the frictional coefficient on that side.

(4) If desired, both operations may proceed concurrently, that is decreasing the frictional coefficient on one side of the paper while increasing it on the opposite side.

(5) The frictional coefficient may also be reduced between facing surfaces of adjacent leaves in an end leaf assembly without modifying the structure of the paper. This may be done by introducing talcum powder or a waxing sheet between the two leaves.

The precise method or means of doing this is unimportant. What is important is the end result, wherein there is a relatively lower coefficient of friction between the outer and intermediate leaves of an end leaf assembly and a relatively higher coefficient of friction between the intermediate and inner leaves. Nor is it important whether this result is achieved by reducing the frictional coefficient between the outer and intermediate leaves or increasing the frictional coefficient between the intermediate and inner leaves.

BRIEF DESCRIPTION OF THE DRAWING

FIG. 1 is a perspective view of a three-leaf assembly, comprising the preferred form of this invention.

FIG. 2 is an end view thereof.

FIG. 3 is an end view of a book, more particularly a bound assembly of book pages, showing two of said end leaf assemblies mounted on opposite sides thereof, in the initial step of the attaching procedure.

FIG. 4 is an end view of such book with a pair of end leaf assemblies mounted thereon, and loop and fold forming means in static engagement with said end leaf assemblies in the second step of the attaching procedure.

FIG. 5 is a view similar to that of FIG. 4, but showing the loop and fold forming means in rotational operation to form loops in the outer leaves of the end leaf assemblies in the third step of the attaching procedure.

FIG. 6 is a view similar to that of FIG. 5, but showing the loop and fold forming means in rotational operation in the opposite directions from those shown in FIG. 5 to commence the loop folding phase (fourth step) of the attaching procedure.

FIG. 7 is a view similar to that of FIG. 6, showing the final step in the loop and fold forming sequence, wherein the loops are folded flat against the book by the loop and fold forming means.

DESCRIPTION OF THE PREFERRED EMBODIMENTS

Figure 8:
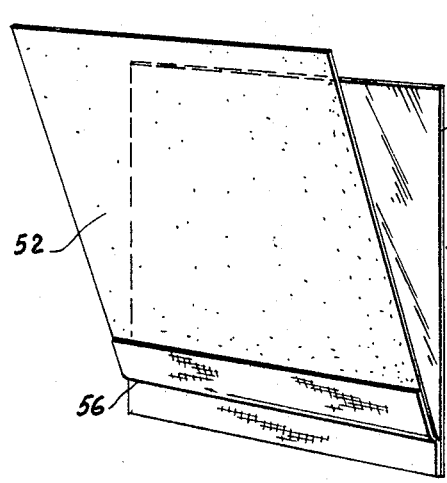
FIG. 8 is a perspective view of a two-leaf end leaf assembly which constitutes another preferred form of this invention.
Figure 9:
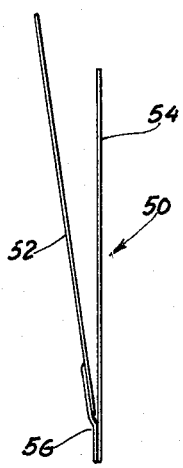
FIG. 9 is an end view thereof.

End leaf assembly 10 shown in FIGS. 1 and 2 is of conventional construction, except as hereinafter described, and it is conventionally attached to each side of book 12, more specifically a bound assembly of book pages requiring end leaves and back and covers for completion. As shown, end leaf assembly 10 comprises three leaves which are hingedly secured to each other along one side edge. This is purely illustrative of the various kinds of end leaf assemblies to which the present invention may be applied or in which the invention may be embodied.

More particularly, assembly 10 consists of an outer leaf 14, an intermediate leaf 16, an inner leaf 18, and a connecting strip 20. Leaves 14, 16 and 18 are conventionally made of paper, strip 20 is conventionally made of paper or woven textile cloth or fabric, e.g., cambric. For the purposes of this description, connecting strip 20 will be deemed made of cambric material. Outer and intermediate leaves 14 and 16 are formed from a single sheet, folded upon itself, the fold 22 functioning as a connecting hinge between these two leaves. Cambric strip 20 extends along fold 22, being secured above the fold to outer leaf 14, and below the fold, to inner leaf 18.

In the first step of the process of attaching end leaf assembly 10 to book 12 (FIG. 3), the lower marginal edge portion 18a of inner leaf 18 (to which edge portion cambric strip 20 is affixed) is glued or otherwise secured to the book immediately adjacent its bound back edge or spine 12a. Outer leaf 14 projects upwardly beyond the pages of the book and the intermediate and inner leaves 16 and 18. In this description the book is oriented as shown in FIG. 3, bound back down, opposite page edges up. What is said of the end leaf assembly on one side of the book applies equally as well to the end leaf assembly on the opposite side and, indeed, in the process herein described, they are mounted concurrently on both sides of the book.

In the second step of the process of attaching end leaf assemblies 10 to book 12 (FIG. 4), the book stands on a suitable support 24. Each outer leaf 14 is engaged manually or by one or more rollers 26 or other sheet engaging or holding means capable of performing the operation about to be described. For purposes of clarity and convenience, the process will be described with particular reference to the rollers 26 shown in the drawing. However, other techniques and means for accomplishing the same results, e.g., cams, friction plates, and eccentric rollers, are encompassed within the intent and scope of this application.

Interrupted arrows 28 indicate relatively light pressure by rollers 26 on the outer leaves 14 on opposite sides of the book. The pressure should be sufficient to enable the rollers to frictionally engage the outer leaves, and, to assist in this regard, the rollers are provided with contacting surfaces having high frictional coefficient. Soft rubber rollers, or soft rubber coated rollers, are suitable for the purposes of this invention.

In third step of the process of attaching end leaf assemblies 10 to book 12 (FIG. 5), rollers 26 are caused to rotate concurrently in opposite directions, as indicated by curved arrows 30 and 30a, the roller on the left of the book, as viewed in FIG. 5, in clockwise direction, the roller on the right in counterclockwise direction. This has the effect of moving outer leaves 14 downwardly to form loops 32 of predetermined dimensions.

This operation requires relative freedom of movement between the outer and intermediate leaves of each end leaf assembly, and substantial resistance to relative movement between the intermediate and inner leaves. As has above been indicated, the facing surfaces of the outer and intermediate leaves, or either of them, may be treated or provided with friction reducing means, e.g., friction reducing coatings, low friction additives, talcum powder, wax paper interleaves, selective calendering, etc. Alternatively, the facing surfaces of the intermediate and inner leaves, or either of them, may be treated or provided with fraction increasing means, e.g., high friction additives, a matte finish, and other means producing the same result.

It is evident from the foregoing, that a relatively high frictional coefficient is required between the facing surfaces of the intermediate and inner leaves, and/or a relatively low frictional cofficient between the facing surfaces of the outer and intermediate leaves. The invention is not limited to any specific means of achieving these results.

In the fourth step (FIG. 6) of the process of attaching end leaf assemblies 10 to book or bound page assembly 12, rollers 26 are pressed more firmly against these leaf assemblies, as indicated by solid arrows 34. This has the effect of locking the end leaf assemblies to the book in the relative positions shown in FIG. 5, the low frictional coefficient between the outer and intermediate leaves being thereby overcome, preventing any further slippage between the outer and intermediate leaves. The rollers are now caused to rotate in opposite directions from those shown in FIG. 5, to wit, those shown by curved arrows 36 and 36a in FIG. 6.

The effect of this action is to move the book and end leaves upwardly as an integral unit as indicated by vertical arrows 38. As this movement proceeds, loops 32 in the outer leaves 14 (FIG. 5) bow outwardly to form enlarged loops 40 of predetermined dimensions shown in FIG. 6.

The final step in the process of attaching end leaf assemblies 10 to book 12 (FIG. 7) occurs when further upward movement of the book (arrows 42) causes the enlarged loops 40 of outer leaves 14 to enter between the rollers and the intermediate and inner leaves 16 and 18, where the loops are squeezed and then flattened against the lower marginal portion 18b of said inner leaves 18. Glue may be introduced between said marginal portion 18b and the opposing face of the flattened loop to secure the two together. More particularly, connecting strip 20 is included in the looping and folding operations. Technically, therefore, the looped and folded portion of said strip is glued to that portion of the strip which is attached to lower marginal portions 18b of inner leaves 18. Nevertheless, for the purposes of this description and the appended claims, connecting strip 20 is deemed a part of the leaves to which it is attached, and consequently it is correct to say that the folded portion of the outer leaves is glued to the marginal portion 18b of the inner leaves.

The process is now completed and the end leaf assemblies are secured to the book in preparation for further bookbinding procedures as will be described in connection with the second form of this invention.

The second preferred form of this invention is shown in its application to a two-leaf end leaf assembly 50 shown in FIGS. 8–12 of the drawing. Although this is the simpler form of the invention, two-leaf end leaf assemblies are less favored in the industry than the three-leaf assemblies of the general type illustrated in FIGS. 1–3.

End leaf assembly 50 is the substantial equivalent of end leaf assembly 10 with the intermediate leaf 16 removed therefrom. Assembly 50 comprises an outer leaf 52 (corresponding to outer leaf 14 of assembly 10), and a connecting strip 56 (corresponding to strip 20 of assembly 10) hingedly attaching leaves 52 and 54 to each other.

By the means above described with respect to end leaf assembly 10, the frictional coefficient between the facing surfaces of leaves 52 and 54 is reduced. Specifically, there is a lower frictional coefficient between leaves 52 and 54 than between inner leaf 54 and the adjacent page of the bound page assembly 58 to which it is attached. This may be achieved by reducing the frictional coefficient of the facing surfaces of both leaves 52 and 54 or only of one of them, preferably, of course, both.

In the application of an end leaf assembly 50 to each side of the bound page assembly 58, inner leaf 54, together with connecting strip 56, of each said end leaf assembly is sewed, adhered or otherwise secured to each side of said bound page assembly along the bound back edge or spine 60 thereof. Outer leaf 52 of each said end leaf assembly is then caused to slide relative to inner leaf 54 in the direction of the bound edge or spine 60 of the book. A loop 62 is thereby formed in the outer leaf extending along the full length of the bound edge or spine. The loop is then squeezed along its entire length to cause it to flatten into a fold 64 which also extends along the bound edge or spine of the bound page assembly 58. The fold is adhered or otherwise secured to the facing surface of the inner leaf 54. Actually, connecting strip 56 is interposed between fold 64 and the inner leaf 54, and said strip is itself folded twice in the manner shown in FIG. 11. One longitudinal section of the strip is secured to the inner leaf 54, and two longitudinal sections of the strip are secured to the inner leaf 54, and two longitudinal sections are secured to the outer leaf 52 on opposite sides of fold 64.

Figure 12:
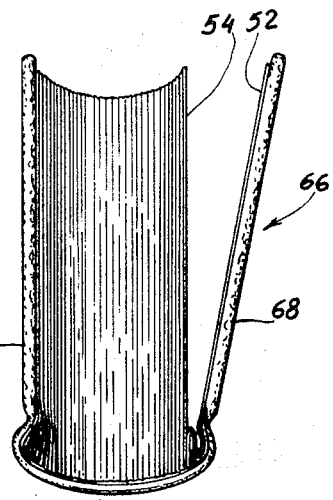
FIG. 12 shows the finished book with a back and outer covers attached to the outer leaves of the end leaf assembly.
Figure 10:
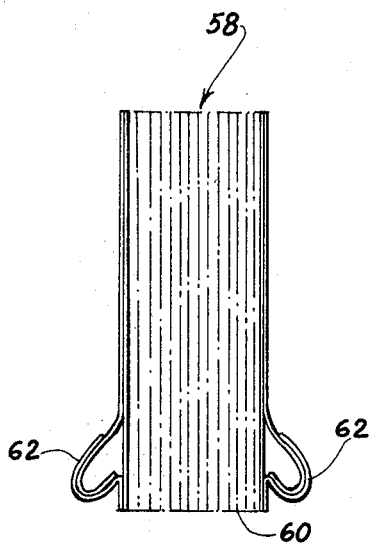
FIG. 10 is an end view of a book, and more particularly a bound assembly of book pages, showing a pair of two-leaf end leaf assemblies mounted on opposite sides thereof, their outer leaves formed with loops to correspond to FIG. 6 of the first form of this invention.
Figure 11:
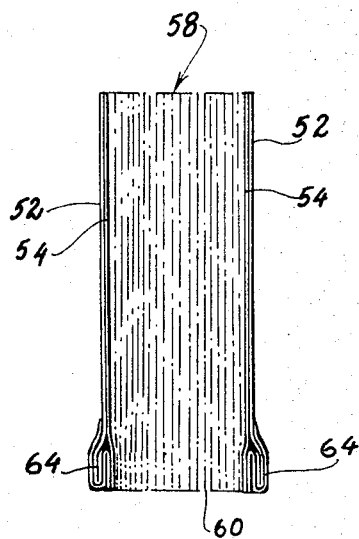
FIG. 11 is a view similar to that of FIG. 10 but showing loops flattened against the book to form folds, this view corresponding to FIG. 7 of the first form of the invention.
Figure 13:
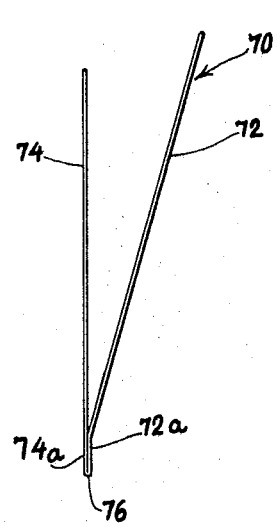
FIG. 13 is an end view of a modified form of two-leaf end leaf assembly.

To complete the bookbinding or rebinding operation, back and cover assembly 66 is mounted on the bound page assembly as shown in FIG. 12. Covers 68 of said back and cover assembly are glued or otherwise secured to outer leaves 52, including the outwardly exposed section of the connecting strip 56.

What has last been said of the final step in the bookbinding operation, namely mounting the back and cover assembly on the bound page assembly, applies equally as well to the first form of this invention as illustrated in FIG. 1–7.

Two-leaf end leaf assemblies may be made by folding a single sheet upon itself to correspond to the outer and intermediate leaves 14 and 16 of three-leaf end leaf assembly 10. Specifically, end leaf assembly 70 is formed of a single sheet folded upon itself to define an outer leaf 72 and an inner leaf 74 joined along fold line 76.

Marginal portion 72a of leaf 72 extending along fold 76, and corresponding marginal portion, 74a of leaf 74, are secured to each other by adhesive or other means.

Figure 14:
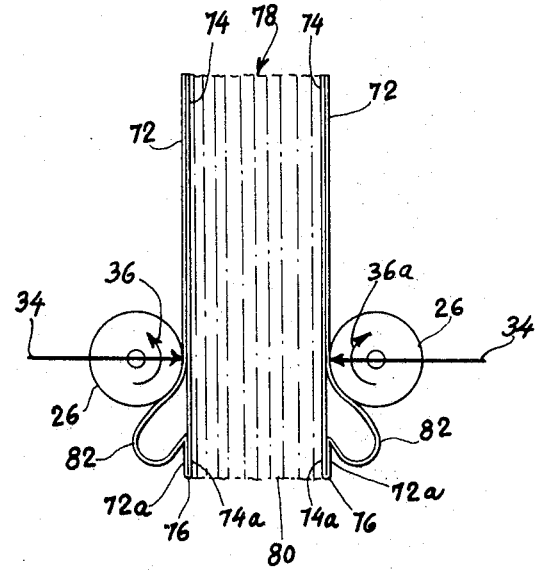
FIG. 14 shows an intermediate step in the process of applying a pair of such end leaf assemblies to a book.
Figure 15:
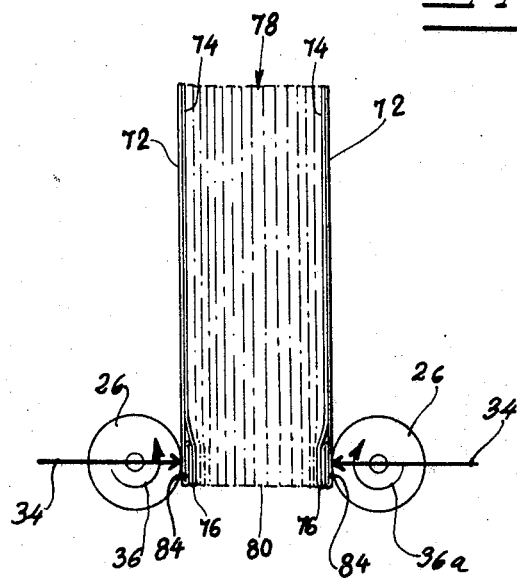
FIG. 15 shows the final step in said process.

In the application of end leaf assembly 70 to a bound page assembly 78, marginal portion 74a is secured to the side of said bound page assembly along its back edge or spine 80. Adhesive or other suitable securing means may be used for this purpose. Leaf 72 is then caused to slide downwardly, relative to leaf 74 to form a predetermined loop, corresponding to loops 32 of FIG. 5, which is then bowed outwardly to form enlarged loop 82 (FIG. 14) corresponding to enlarged loops 40 of FIG. 6 and 62 of FIG. 10. Loop 82 is then squeezed and flattened to form a fold 84 which is secured to marginal portion 72a (FIG. 15) by adhesive or other means. The remaining bookbinding steps described in connection with end leaf assembly 50 (FIG. 12) apply equally as well to end leaf assembly 70.

The forms of this invention above described are intended to be illustrative of its broad scope, limited only by the scope of the appended claims.

What is claimed is:

1. An end leaf assembly for use in the binding and rebinding of books, comprising:
    (a) a pair of interconnected end leaves,
    (b) the facing inner surfaces of said leaves having a lower frictional coefficient than their outer surfaces,
    (c) to provide relative freedom of movement between said end leaves.

2. An end leaf assembly in accordance with claim 1, wherein:
    (a) the end leaves are interconnected by means of a connecting strip secured to corresponding side edges of said leaves, and
    (b) friction reducing means provided between said leaves.

3. An end leaf assembly in accordance with claim 1, wherein:
    (a) the end leaves are formed of the same sheet folded over upon itself,
    (b) corresponding marginal portions of both leaves,
    (c) being secured to each other along the fold line.

4. An end leaf assembly in accordance with claim 1, wherein:
    (a) the facing inner surfaces of the end leaves are provided with a low-friction coating
    (b) to reduce the frictional coefficient between them.

5. An end leaf assembly in accordance with claim 1, wherein:
    (a) the facing surfaces of the end leaves are steamed while calendered
    (b) to reduce the frictional coefficient between them.

6. An end leaf assembly in accordance with claim 1, wherein:
    (a) a low-friction interleaf is provided between the end leaves
    (b) to reduce the frictional coefficient between them.

7. An end leaf assembly in accordance with claim 1, wherein:
    (a) a third leaf is interconnected with the pair of end leaves
    (b) to form a three-leaf assembly,
    (c) the frictional coefficient between said pair of end leaves being lower than between them and the third leaf.

8. An end leaf assembly in accordance with claim 7, wherein:
    (a) one of the end leaves is situated intermediate the other end leaf and the third leaf,
    (b) said end leaves being formed of the same sheet folded over upon itself, and
    (c) a connecting strip securing said end leaves, along the fold line between them, to the third leaf.

9. An end leaf assembly in accordance with claim 8, wherein:
    (a) the facing inner surfaces of the pair of end leaves are steamed while calendered to provide a lower frictional coefficient between them (b) than between the third leaf and said pair of end leaves.

10. An end leaf assembly in accordance with claim 8, wherein:
 (a) the facing inner surfaces of the pair of end leaves are provided with a low-friction coating
 (b) to provide them with a lower frictional coefficient than between the third leaf and said pair of end leaves.

11. A bookbinding and rebinding method, comprising the steps of:
 (a) providing an assembly of book pages bound in the back,
 (b) attaching the inner leaf of an end leaf assembly to each side of the book page assembly along its bound back,
 (c) sliding the outer leaf of each such end leaf assembly and toward the bound back of the book page assembly
 (d) to form a loop in said outer leaf extending along said bound back,
 (e) squeezing said loop along its length to flatten it and
 (f) form a fold in said outer leaf extending along said bound back,
 (g) securing said outer leaf fold to the inner leaf, and
 (h) attaching a cover and back assembly to said outer leaves
 (i) to encase the bound book page assembly.

12. A bookbinding and rebinding method in accordance with claim 11, wherein:
 (a) the inner leaf of each end leaf assembly is fastened to the book page assembly along its bound back,
 (b) the fold in the outer leaf of each end leaf assembly is adhered to the inner leaf along the bound back of the book page assembly,
 (c) to cover the glued portion of said inner leaf, and
 (d) the covers are glued to the folded outer leaves.

13. A bookbinding and rebinding method in accordance with claim 11, wherein:
 (a) each end leaf assembly consists of two leaves,
 (b) one outer and one inner leaf,
 (c) hingedly connected along one side edge, and
 (d) being attached along said hingedly connected side edge to the side of the book page assembly,
 (e) said outer leaf being caused to slide relative to the inner leaf in the loop-forming step.

14. A bookbinding and rebinding method in accordance with claim 11, wherein:
 (a) each end leaf assembly consists of three leaves,
 (b) an outer leaf, an inner leaf, and an intermediate leaf,
 (c) all hingedly interconnected along one side edge, and
 (d) being attached along said hingedly interconnected side edge to the side of the book page assembly,
 (e) said outer leaf being caused to slide relative to the intermediate and inner leaves in the loop-forming step.

References Cited

UNITED STATES PATENTS

| | | | |
|---|---|---|---|
| 805,811 | 11/1905 | Ortla | 281—21 |
| 805,812 | 11/1905 | Ortla | 281—21 |
| 1,561,995 | 11/1925 | Pearson | 281—21 |
| 1,640,850 | 8/1927 | Otto | 281—23 |
| 3,330,718 | 7/1967 | James et al. | 281—21 X |

LAWRENCE CHARLES, Primary Examiner

U.S. Cl. X.R.

156—554